March 15, 1960     M. B. RODGERS     2,928,300
HOLE SEALING DEVICE FOR TIRES
Filed Oct. 25, 1957
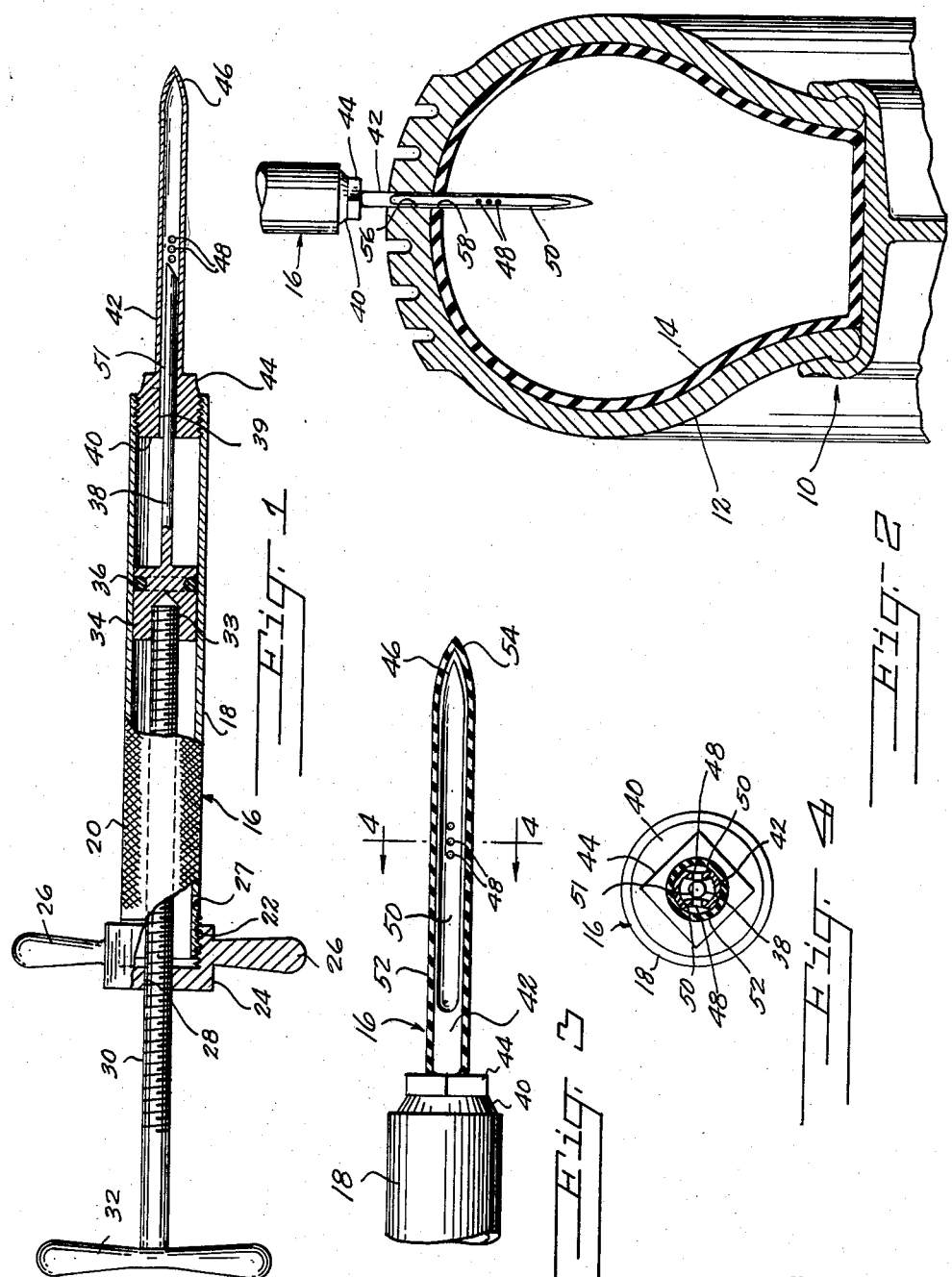
INVENTOR.
Mansel B. Rodgers,
BY
McMorrow, Berman & Davidson
ATTORNEYS

United States Patent Office 2,928,300
Patented Mar. 15, 1960

2,928,300

HOLE SEALING DEVICE FOR TIRES

Mansel B. Rodgers, Memphis, Tenn.

Application October 25, 1957, Serial No. 692,330

3 Claims. (Cl. 81—15.6)

The present invention relates to a tool having the general appearance and some of the characteristics of a hypodermic needle, designed for the purpose of sealing holes made by nails and other sharp objects in tires, not only tubeless tires, but also automobile, truck or tractor tires of the type including a casing and inner tube.

The main object of the present invention is to provide a needle-like gun or sealing device, adapted to serve the purpose of effecting a permanent seal in tires of the several types noted above, where a hole has been made in the tire by a nail or similar object.

Often, when a nail penetrates a tire casing, initially the nail itself seals the hole, so that a flat tire does not occur, at least immediately. In such circumstances, the device constituting the present invention is intended to be used, and one important object is to provide a sealing device as stated which will permit gum, liquid rubber, or any other suitable sealer to be injected into the tire without the necessity of first letting the air out of the tire. Obviously, by reason of this arrangement, if the nail or other object is noticed in time, no flat will occur.

Summarized briefly, the invention includes a barrel, and connected to and closing one end of the barrel is an elongated needle adapted to penetrate a tire casing. The needle is closed at its outer end, but intermediate its ends has a plurality of small apertures through which the sealant is forced.

A piston is rotatable and shiftable axially of and within the barrel, and extending from the piston is an elongated, needle-like element extending into the hollow needle. Said element has a flat surface, providing a self-cleaning action when the element is shifted within the needle. Means is connected to the piston for shifting the same axially within the barrel and also for rotating the same, said means including a threaded shank, threadedly engaged in a nut-like cap provided at the other end of the barrel, said cap in turn being threaded upon the barrel.

Among other objects of the invention are the following:

To provide a device of the type stated which will permit the sealing of holes in tires, with maximum speed and ease;

To permit the sealing operation to be carried out by a relatively unskilled person;

To permit the sealing operation to be carried out without relieving the tire of air pressure, so that if the tire-penetrating object is noticed in time, the tire will not go flat;

To provide a device as stated particularly designed to permit the sealing operation to be carried out with a relatively small supply of sealant, thus to permit the device to be compactly made, and hence capable of storage in a relatively small area;

To provide a self-cleaning action within the device, resulting during the normal use of the device in sealing an opening; and To provide a novel external configuration of the tire-penetrating needle, adapted to flex the material of the tire for the purpose of working the sealer into all crevices about the opening.

Other objects will appear from the following description, the claims appended thereto, and from the annexed drawing, in which like reference characters designate like parts throughout the several views, and wherein:

Figure 1 is a longitudinal sectional view through a sealing device formed according to the present invention, a portion being left in elevation;

Figure 2 is a fragmentary elevational view of the device, in use during the sealing of an opening in a tire, said tire being shown in section;

Figure 3 is an enlarged elevational view of the tire-penetrating portion of the device, a protective needle cover being applied to the needle and being shown in longitudinal section; and Figure 4 is a transverse section, still further enlarged, on line 4—4 of Figure 3.

Referring to the drawing in detail, designated generally at 10 is a wheel rim, on which is mounted a tire casing 12, in which is disposed a conventional tube 14. Although the device is shown applied to a tire of this type, the device can be applied with equal facility to tubeless tires, as will presently appear.

The device constituting the invention has been generally designated at 16, and includes an elongated, cylindrical, constant diameter barrel 18, the outer surface of which is knurled or otherwise roughened as at 20 to provide a better grip thereon.

At its outer end, the barrel has external threads 22, engaging internal threads provided upon a cap nut 24 formed with diametrically opposed, radial wings 26.

Adjacent the outer end of the barrel, the wall of the barrel is formed with a vent opening 27, so that air may enter or leave the barrel in back of the piston, to permit the reciprocation of the piston within the barrel.

Centrally formed in the cap nut 24 is a threaded opening 28, and said opening is threaded for engagement with threads formed on an elongated plunger or stem 30, the outer end of which projects beyond the outer end of the barrel and is provided with a handle 32 facilitating rotational movement of the stem.

Stem 30, within the barrel, is engaged in a threaded, axial recess 33 provided in a piston 34 the external surface of which is grooved to receive an O-ring 36 having wiping, sealing contact with the inner surface of barrel 18.

Projecting forwardly from and integral with the piston 34 is an elongated needle cleaner 38, extending through an axial bore 39 formed in the enlarged head 40 of an elongated, hollow needle 42. Head 40 is externally threaded to engage internal threads provided at the inner end of barrel 18 and is formed with a reduced, non-circular portion 44 disposed exteriorly of the barrel to facilitate turning of the head 40 into and out of the threads of the barrel.

At its outer end, the hollow needle 42 is permanently closed, and said outer end is tapered as at 46 to facilitate the extension of the needle into an opening formed in the casing and tube 14 by a nail or other object, not shown.

Located substantially medially between the opposite ends of the needle 42 is a row of closely spaced, small apertures 48, said row extending parallel to the needle axis. Said apertures 48 provide outlets for a gum rubber sealant, or other sealing material, not shown.

Referring now to Figures 3 and 4, the outer surface of the needle is formed with longitudinally extending grooves 50. A pair of said grooves is provided, with the grooves of the pair being diametrically opposite one another and being transversely curved inwardly as shown in Figure 4. The grooves 50 extend fully from the tapered end 46 of the needle 42, and terminate a short distance from the non-circular collar portion 44 of the needle as best shown in Figure 3. There are two rows of apertures 48 as shown in Figure 4, said rows being diametrically opposite one another, the apertures opening through the wall of the needle within the grooves 50, medially between the opposite sides of said grooves. As may be further noted from Figure 4, a flat surface 51 is formed upon the needle cleaner 38, extending substantially the full length thereof, which flat surface permits the sealant to travel into the needle, while at the same time preventing the needle from becoming clogged.

As shown in Figure 1, the outer end of the needle cleaner is beveled, this arrangement serving to facilitate the movement of the needle cleaner into the needle, as will be readily apparent.

When the device is not in use, the needle is protected by a cover 52, of a length and cross sectional shape corresponding substantially to that of the needle 42. Thus, the cover 52 is open at one end to permit its being fitted over the needle, the other end being tapered and closed as at 54. The cover 52 is of resilient rubber material, and in the normal, unexpanded condition of the cover the inner diameter thereof is slightly less than the outer diameter of the needle 42. As a result, when the cover is fitted onto the needle, it stretches somewhat, so as to fit snugly upon the needle, thus to effectively prevent rubber from drying within the needle through the provision of an airtight seal.

In use of the device, the barrel is charged, forwardly of the piston 34, with a suitable amount of a rubber gum sealant or other sealing material of a type that will bond tightly to the rubber of the tire, and will dry on exposure to air. To charge the barrel with a quantity of sealant, the cap nut is removed, and the stem and piston are also removed. Thereafter, the parts are returned to the position shown in Figure 1. The cover 52 is removed, and the nail or other object is extracted from the holes 56, 58 formed thereby in the tire casing and tube 12, 14 respectively.

The device is now ready for use, and it is merely necessary that the needle 42 be inserted through the holes 56, 58. Then, the stem handle 32 is rotated. Preliminary to rotation of the stem handle, the needle may be rotated a few times within the holes 56, 58 to insure that the needle is fully through the hole in the tube as well as that of the tire, with the openings or apertures 48 disposed fully within the tire.

When the stem handle is rotated two or three turns in a direction to advance the piston within the barrel, the sealant will be forced out of the small apertures 48, and will coat itself upon the outer surface of the needle. Then, the device is slowly removed, with the entire device being rotated as it is pulled out of the tire, in either direction. The wings 26 on the cap nut facilitate this step of the operation. This leaves most of the sealant inside the tire.

When the needle is pulled from the tire and is rotated in either direction, it will set up a flexing motion in the wall of the tire and tube holes, since it is formed with the diametrically opposed grooves, and hence is not completely round through its full outer circumference, thus causing part of the sealant to travel back through the hole within the needle, sealing out dust and water through the entire area of the holes of the tube and tire casing.

It should be noted that the particular location and arrangement of the apertures 48 is especially designed to overcome back pressure in an inflated tire, so that the sealant will be effectively forced out of the small apertures 48 into the tire.

The device can of course be charged with sealant in any suitable manner. For example, a collapsible tube containing a quantity of the sealant may have a threaded neck engageable in the outer end of the barrel, so that the sealant will be forced into the barrel responsive to a collapsing pressure exerted against the tube. Alternatively, the device might be filled from a can of sealant by inserting needle 42 in the sealant, and by then rotating the handle 32 in a direction to retract the piston, thus drawing the sealant upwardly through the needle into the chamber defined between the piston 34 and the head 40 of the needle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A device for sealing a hole in a tire comprising a barrel adapted to hold a quantity of fluid sealant; a hollow needle communicating at one end with the barrel, the other end of the needle being closed and being pointed for extension through the hole formed in the tire, said needle having a pair of diametrically opposed, longitudinally extending grooves formed straight from end to end and extending from the pointed end of the needle and terminating inwardly from the first named end of the needle, the needle being formed intermediate its ends with rows of closely spaced apertures opening into said grooves to provide outlets for the sealant; and piston means shiftable axially of the barrel for forcing the sealant through the outlet and including a rod-like needle cleaning element extending into said needle, there being a longitudinal passage defined between the element and needle from the barrel to said outlet to permit flow of sealant between the barrel and outlet, said element being rotatable in and in wiping contact with the needle throughout the length of the passage.

2. A device for sealing a hole in a tire comprising a barrel adapted to hold a quantity of fluid sealant; a hollow needle communicating at one end with the barrel, the other end of the needle being closed and being pointed for extension through the hole formed in the tire, said needle having a pair of diametrically opposed, longitudinally extending grooves extending from the pointed end of the needle and terminating inwardly from the first named end of the needle, the needle being formed intermediate its ends with rows of closely spaced apertures opening into said grooves to provide outlets for the sealant; and piston means shiftable axially of the barrel for forcing the sealant through the outlet and including a rod-like needle cleaning element extending into said needle, said element having part of its circumference cut away to define thereon a flat surface extending for at least the distance between the outlets and barrel in sealant-expelling positions of the element, the element being in continuous wiping contact elsewhere on its circumference with the wall of the needle, said piston means being rotatable within the barrel and needle whereby to prevent clogging of the needle responsive to rotation of the needle-cleaning element therein.

3. A device for sealing a hole in a tire comprising a barrel adapted to hold a quantity of fluid sealant; a hollow needle communicating with the barrel and adapted for extension through the hole formed in the tire, said needle having a plurality of straight, elongated, longitudinal, external grooves angularly spaced about its circumference, the needle being of constant cross-sectional area and being of circular external cross-sectional shape, except for the provision of said grooves, over the full length of the grooves, the needle being formed with at least one aperture opening into each groove and providing an outlet for the sealant; and piston means shiftable axially of the barrel for forcing the sealant through each outlet and including a rod-like needle-cleaning element extending into said needle, the cross-sectional area of said element being less than that of the needle interior for at least that portion of the needle length that extends from the barrel to said outlet in sealant-expelling positions of the piston means, thus to define between the needle and element a continuous longitudinal passage for the sealant extending from the barrel to the outlets.

References Cited in the file of this patent

UNITED STATES PATENTS

| | | |
|---|---|---|
| 546,073 | Mix | Sept. 10, 1895 |
| 616,572 | Herrick | Dec. 27, 1898 |
| 696,384 | Wall et al. | Mar. 25, 1902 |
| 864,225 | Blodgett | Aug. 27, 1907 |
| 1,539,637 | Bronner | May 26, 1925 |
| 2,634,726 | Hanson | Apr. 14, 1953 |
| 2,799,272 | Peach | July 16, 1957 |

FOREIGN PATENTS

| | | |
|---|---|---|
| 638,354 | France | May 23, 1928 |